UNITED STATES PATENT OFFICE.

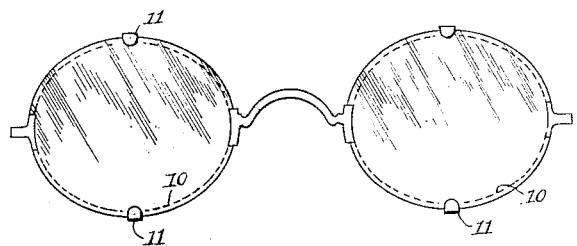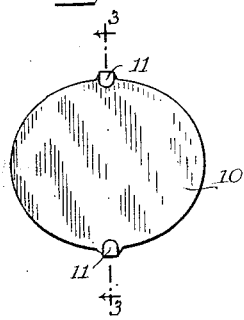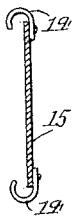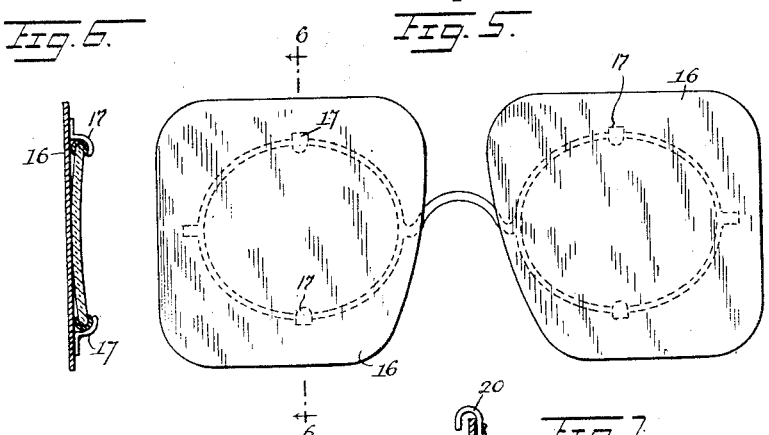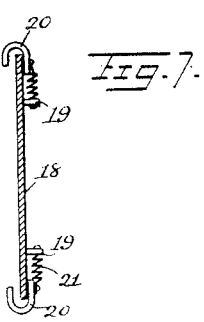

KURT R. GITTERMAN, OF BROOKLYN, NEW YORK.

SPECTACLE-SHADE.

1,348,712. Specification of Letters Patent. Patented Aug. 3, 1920.

Application filed October 22, 1919. Serial No. 332,387.

*To all whom it may concern:*

Be it known that I, KURT R. GITTERMAN, a citizen of the United States, and a resident of the city of New York, borough of Brooklyn, county of Kings, and State of New York, have invented a new and Improved Spectacle-Shade, of which the following is a full, clear, and exact description.

This invention relates to eye shades, and more particularly to an eye shade for use on spectacles and eye glasses of all kinds.

An object of the invention is to provide a new and usefully improved eye glass shade which may be mounted on the frame or lens of the eye glass or spectacles in order to form a pair of shaded spectacles or eye glasses. It is an object to provide spectacle shade pieces which are small and convenient to handle, and which may be carried in the spectacle case with the owner's glasses and be placed in position over the spectacle lens and removed therefrom at will.

I have in view in this invention, to provide an eye glass lens or a shaded transparent member which may be mounted on the spectacle frame or slipped in position on the lens by any one of the various novel methods herein disclosed.

With the above and other objects in view, the invention has relation to a certain combination and arrangement of parts, an example of which is set forth in the several appended claims, and described in the following specification, and portrayed in the accompanying drawings, wherein:—

Figure 1 shows a pair of nose glasses with the shaded transparent members mounted thereon.

Fig. 2 is a view of one shaded transparent member showing hooks for engaging the lens of the spectacles. Fig. 3 illustrates a cross sectional view on the line 3—3 of Fig. 2. Fig. 4 illustrates a modified form of the shade member with hooks riveted thereon, Fig. 5 presents a modified form of spectacle shades in order to illustrate how the spectacles may be equipped with large shaded pieces to convert an ordinary pair of nose glasses into suitable driving goggles or sun shades, and Fig. 6 is a cross sectional detailed view taken on the line 6—6 of Fig. 5.

Fig. 7 illustrates a modified form of spectacle shade with an improved flexible hook mounting shown.

Referring more in particular to the drawings, and as is illustrated in Figs. 1, 2, and 3, there is shown a shaded transparent member 10 having a peripheral contour similar to the peripheral contour of the lens of ordinary spectacles. The shade 10 will preferably be made of celluloid and may be colored to suit the fancy of the wearer. It may be tinted in emerald, amber, or clouded in order to obtain a shaded effect for the eyes in sun light. The shade member 10 has integrally formed thereon hooks 11. These hooks 11 are bent over from the periphery of the shade member to form engaging means with the lens of the spectacles. By observing Fig. 1 it is seen how the shaded member with hooks 11 is slipped on the eye glass lens by pushing the hooks over the rim of the lens until the shade 10 is frictionally mounted on the nose glasses. The shaded member 10 may be removed and replaced at will on the nose glasses or any other form of spectacle where it is practical to allow the hooks 11 to engage the rim of a shade.

Fig. 4 illustrates a modified form of shade and discloses a pair of metallic hooks 14 secured to a shade member 15 by riveting the hooks to the shade or by cementing the hooks to the shade. In this instance the hooks and shade member may be made of dissimilar material.

Figs. 5 and 6 present another modified form of the spectacle shade device. In this case the shade members 16 are made larger than the spectacle or eye glasses, and hooks 17 are cemented or otherwise fixed to the shade. The shade may be pushed upon the lens to hold it in the position shown in Fig. 5.

Fig. 7 illustrates a flexible type of eye glass shade mounting and will adequately fit upon the spectacles of various sizes where the range of difference in lens size is not too great. In this case the shade member 18 has lugs 19 made thereon, and a pair of hooks 20 are slidably mounted on the shade 18 and held in position by a brad or other means. A spring 21 connects each lug with each hook 20. The springs act to keep the hooks 20 in closed limited position. When the shade is pushed upon the rim of spectacles or on a large lens, the hooks 20 yield slightly thereby allowing the device to adapt itself to a variation of eye lens size.

This form of eye glass shade is particularly valuable to motorists, people with weak eyes, and others who necessarily require shaded glasses at times. The use of this form of shade will obviate the necessity of carrying extra glasses. The shaded lenses may be carried in the spectacle case and be immediately available at all times.

The invention is presented to fulfil the need felt for an eye glass shade of this character.

Having thus described my invention, what I claim as new and desire to secure by Letters Patent is:

1. A detachable shade for spectacles consisting of a thin flexible transparent member adapted to fit over the lens, and integral hooks formed on said member adapted to engage the edges of the lens for retaining the same in place.

2. An eye-glass shade for spectacles, comprising a thin flexible piece of transparent celluloid to fit over a spectacle lens, and integral celluloid hooks made on the celluloid shade to engage the spectacles.

KURT R. GITTERMAN.